United States Patent
Byskov Skafsgaard et al.

(10) Patent No.: US 10,900,490 B2
(45) Date of Patent: Jan. 26, 2021

(54) METHOD FOR CONTROLLING A CIRCULATION PUMP IN AN INSTALLATION COMPRISING AT LEAST TWO CIRCULATION CIRCUITS

(71) Applicant: GRUNDFOS HOLDING A/S, Bjerringbro (DK)

(72) Inventors: Martin Byskov Skafsgaard, Silkeborg (DK); Bent Døssing, Silkeborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 383 days.

(21) Appl. No.: 14/427,359

(22) PCT Filed: Sep. 2, 2013

(86) PCT No.: PCT/EP2013/068079
§ 371 (c)(1),
(2) Date: Mar. 11, 2015

(87) PCT Pub. No.: WO2014/040874
PCT Pub. Date: Mar. 20, 2014

(65) Prior Publication Data
US 2015/0211528 A1    Jul. 30, 2015

(30) Foreign Application Priority Data

Sep. 12, 2012    (EP) .................................. 12184096

(51) Int. Cl.
*F04D 15/00*    (2006.01)
*F24D 3/10*    (2006.01)
(Continued)

(52) U.S. Cl.
CPC ........... *F04D 15/0005* (2013.01); *F04D 1/00* (2013.01); *F04D 13/06* (2013.01);
(Continued)

(58) Field of Classification Search
CPC ............. F01P 7/161; F04D 1/00; F04D 13/06
See application file for complete search history.

(56) References Cited

U.S. PATENT DOCUMENTS 5,248,085 A  *  9/1993  Jensen .................... F24D 3/105
237/19

FOREIGN PATENT DOCUMENTS

DE        41 27 822 A1    2/1993
DE       197 51 515 A1    6/1999
(Continued)

OTHER PUBLICATIONS

Kettner et al, 14427359_2017-02-08_EP_0953808_A2_I_MachTrans (English), Nov. 1999.*

*Primary Examiner* — Kenneth J Hansen
(74) *Attorney, Agent, or Firm* — McGlew and Tuttle, P.C.

(57) ABSTRACT

A method controls a circulation pump (1) in an installation with at least two circulation circuits (3, 4), with which the circulation pump (1) is integrated by way of a switch-over valve (2) into the one or the other circulation circuit (3 or 4) depending on the switched position. The pump (1) is activated differently depending on the switched position of the switch-over valve (2). The switch-over procedure is detected by way of determining the pressure course and/or the flow rate course in the pump (1) or an electrical variable which is dependent thereon, of the motor driving the pump, and the pump (1) is operated in another manner accordingly.

17 Claims, 3 Drawing Sheets

(51) Int. Cl.
*F24D 19/10* (2006.01)
*F04D 1/00* (2006.01)
*F04D 13/06* (2006.01)

(52) U.S. Cl.
CPC ......... *F04D 15/0016* (2013.01); *F24D 3/105* (2013.01); *F24D 19/1012* (2013.01); *F24D 19/1066* (2013.01)

(56) References Cited

FOREIGN PATENT DOCUMENTS

| | | |
|---|---|---|
| DE | 195 25 887 C2 | 6/2002 |
| DE | 197 17 799 C5 | 2/2007 |
| EP | 0 150 068 A2 | 7/1985 |
| EP | 0 460 399 A2 | 12/1991 |
| EP | 0 953 808 A2 | 11/1999 |
| EP | 1 323 984 A1 | 7/2003 |
| EP | 2 224 175 A1 | 9/2010 |

* cited by examiner

METHOD FOR CONTROLLING A CIRCULATION PUMP IN AN INSTALLATION COMPRISING AT LEAST TWO CIRCULATION CIRCUITS

CROSS REFERENCE TO RELATED APPLICATIONS

This application is a United States National Phase Application of International Application PCT/EP2013/068079 filed Sep. 2, 2013 and claims the benefit of priority under 35 U.S.C. § 119 of European Patent Application EP 12184096.1 filed Sep. 12, 2012, the entire contents of which are incorporated herein by reference.

FIELD OF THE INVENTION

The present invention to a method for controlling a circulation pump in an installation with at least two circulation circuits, with which the circulation pump is integrated by way of a switch-over valve into the one or the other circulation circuits depending on the switched position, wherein the pump is activated differently depending on the switched position of the switch-over valve, as well as to a circulation pump assembly with a speed-controllable electric motor, with a centrifugal pump driven by this and with a control for the speed control of the motor.

BACKGROUND OF THE INVENTION

With modern centrifugal pumps which are controlled by frequency converter and which may adapt their operating point in large ranges to the demands of the installation in an almost optimal manner by way of rotational speed change, it is counted as belonging to the state of the art to automatically recognize demands specific to the installation by way of the pump itself, i.e. in particular by way of the sensor devices present in the pump and/or by way of the electrical variables of the drive and which on the part of the frequency converter are available without further ado, and to activate the pump accordingly. Such a method and such a circulation pump are known from EP 1 323 984 A1. Hereby, events typical of the installation are detected or acquired by way of detecting the consumer-side course characteristics of the delivery pressure or of the delivery rate or of a variable from which the latter can be derived, and the pump is correspondingly adapted with regard to the rotational speed. Thus the pump without special signal communication with the heating installation can recognize when the heat demand is high and thus also when the pump power or output should be high and vice versa. Such events as a night reduction, summer, winter or likewise, may also be detected on the part of the pump, and thus be accordingly taken into account with the activation of the pump.

Such circulation pumps which have implemented such a method in the control electronics in the meanwhile are available on the market and may be put into operation practically without any setting after installation into the heating installation. They adapt automatically to the heating installation and find their optimal operating point in a manner depending on the installation and situation.

This however, with heating installations or also other installations, with which two or more circulation circuits which are connected to the pump via a switch-over valve, functions only to limited extent. Such switch-over valves for example with compact heating installations are counted as belonging to the state of the art. By way of switching over, they serve for connecting the circulation pump normally connecting a primary heat exchanger to the heating circuit for room heating, to a secondary heat exchanger, typically a plate heat exchanger, when warm service water is required from a tapping location, in order then to lead the complete heating output of the primary heat exchanger to this secondary heat exchanger for the service water heating. Thereby, it is then necessary to operate the circulation pump controlled with a closed loop according to the demands by the room heating, in another manner to a higher power, in order to ensure a rapid and intensive heat transport from the primary heat exchanger to the secondary heat exchanger for the service water heating. Moreover, applications are also conceivable, with which two or more circulation circuits are to be switched over, for example with a heating of the service water which operates with solar collectors, and at night are to be switched over from the solar collector circuit to a circuit heated by fuel.

The switch valves for switching over between two or more circulation circuits may basically be designed in an infinite manner. However, with compact heating installations, a switch-over valve with, which an electromotorically controlled lever selectively closes the one or the other heating circuit has proved its worth, wherein both circuits are opened briefly during the switch-over. Such switch-over valves are known for example from DE 197 51 515 A1 or DE 197 17 799 C5.

SUMMARY OF THE INVENTION

Against this background, it is an object of the invention, to design a method of the known type, for controlling a circulation pump, such that switch-over procedures are automatically recognized in the installation and the pump is automatically operated in another manner without a signal-leading communication to the control of the installation being required. Moreover, a circulation pump is to be provided, which automatically recognizes switch-over procedures of the previously mentioned type and accordingly operates the pump in another manner.

The method according to the invention for the control of a circulation pump in an installation with at least two circulation circuits, with which the circulation pump is integrated into the one or the other circulation circuit by way of a switch-over valve, depending on the switched position, wherein the pump is activated differently depending on the switched position of the switch-over valve, according to the invention is characterized in that the switch-over procedure is detected by way of determining the pressure course and/or the flow rate course in the pump or of an electrical variable which is dependent thereon, of the motor driving the pump, and the pump is accordingly operated in another manner given a detection of such a switch-over procedure.

The basic concept of the invention is thus to utilize the hydraulic procedures in the pump or the electrical variables of the motor which are derived therefrom, to detect the switch-over procedure of the switch-over valve, in order to then to automatically operate the pump in another manner such that it runs at the operating point/characteristic curve which is optimal for the respective circulation circuit. This method of course assumes the knowledge of the hydraulic behavior of the switch-over valve, but in practice may be adapted to present valve arrangements quite simply, by way of the pressure courses/flow courses being detected before, during and after the switching-over and being used for a later determining of the switching procedure. This is particularly simple to ascertain with the initially described switch-over valve in a heating installation, said switch valve being characterized in that during the switch-over procedure, briefly both circulation circuits, thus in a heating installation the heating circuit for room heating as well as the heating circuit for serve water heating are simultaneously connected to the primary heat exchanger and the circulation pump which is arranged before or after this. In contrast, one of the two heating circuits is closed before the switching procedure and after the switching procedure. Basically, it is simplest to determine these hydraulic procedures in the pump by way of electrical variables of the motor which are derived therefrom. However, with asynchronous motors of a medium size for example, such a determining may not always be unambiguously effected over the whole rotational speed range, which is why, it can be useful as the case may be, to use the electrical variables only over a part range, or as the case may be, supplementary hydraulic variables, for example the pressure or differential pressure within the pump, over another part range, for determining the switch-over procedure.

Advantageously, not only the switch-over procedure of the switch-over valve is detected, but moreover also the switched position of the valve. This too, according to the invention, is detected by way of determining the pressure course and/or the flow rate course in the pump, or an electrical variable of the motor which is dependent thereon. The detection of the switched position on the one hand has the advantage that the pump automatically finds the correct operating point after switching on, and on the other hand that the pump, given an erroneous determining of a switch-over procedure, as it may occur due to system disturbances, recognizes this and automatically falls back again into the activation suited to the switched condition.

The method according to the invention may in particular be advantageously applied to a circulation pump for a heating installation with two heating circuits, one for service water heating and one for room heating, since then commercially available pumps, as are usually applied in heating installations, may be used for multi-circuit heating installations, as are typically applied in heater boilers of central heating and likewise. Such installations may then also be retrofitted with consumption-optimized pumps, without an adaptation being required on the part of the installation, which is particularly advantageous with older installations, with which a suitable technical support from the installation manufacturer is no longer to be expected.

It is useful to continuously, i.e. constantly detect the pressure course and/or the flow rate course in the pump or an electrical variable of the motor, which is dependent thereon, in order to detect the switch-over procedure as well as the switched position. It is advantageous to detect the respective variables (pressure course, flow rate course or electrical variables of the motor which are dependent thereon), during the switch-over procedure and/or directly before and after the switch-over procedure, for determining the switch-over procedure itself, since hydraulic changes which are characteristic for the switch-over procedure occur in this time window, as is yet to be explained in a detailed manner further below by way of one embodiment example. The switched position of the switch-over valve on the other hand is advantageously determined by the course of the hydraulic variables, i.e. by the pressure course and/or the flow rate course or an electrical variable of the motor, said variable being dependent thereon, between temporally consecutive switch-over procedures. In the context of the invention, directly before or after the switch-over procedure is to be understood as a time of up to 10 seconds before or after the switch-over procedure.

Basically, such a switching procedure may be determined by way of hydraulic characteristics which are characteristic of the switch-over procedure and which although being dependent on the design construction of the switch-over valve within certain limits, however in principle may also be determined independently thereof. In order to increase the reliability of the determining or evaluation, it is however advantageous if the pressure course or flow rate course or the course of electrical variable of the motor entailed by this, for the switch-over procedure or for the switched position, is compared to predefined characteristic values, in order to detect this with a high accuracy. The characteristic values may either be determined by way of measuring in the installation itself and subsequent storage or however prescribed on the part of the factory, as is useful for example with a correspondingly designed heating circulation pump for the above described switch-over valves. Thereby, it is useful if, on monitoring the switched position with the method according to the invention, when a pump control differing from the determined switched position is ascertained, for a corresponding switch-over in the pump control to be effected, which advantageously may be effected automatically by the control itself.

Thus, for the initially described switch valve in a compact heating installation, the switched position for the service water heating may be determined by way of values being constantly determined over time. With the service water heating, after the effected switch-over, i.e. after the integration of the circulation pump into the heating circuit for service water heating, the hydraulic resistance does not change, since no fittings changing the conduit resistance are provided in this circuit. Moreover, the conduit resistance in the heating circuit for the service water heating is typically significantly lower than that in the heating circuit of the room heating, and the latter feature may also be used for determining the switching position.

The switched position for the room heating in contrast is typically determined by way of a temporal change of the values being ascertained, for example of the flow rate, since the heating circuit for the room heating mostly has a multitude of valves, in particular also thermostat valves which are controlled in a temperature-dependent manner and which change the conduit resistance and thus the hydraulic values of the pump integrated into this circuit which result therefrom.

The method according to the invention is advantageously used in combination with a circulation pump with a speed-controllable electric motor and with a centrifugal pump driven by this, with a control for the speed control of the motor. The control is then also envisaged and designed for the detection of a switch-over procedure according to the method according to the invention, according to which the pump is switched automatically over from the delivery in one circulation circuit into another and vice versa.

Particularly advantageously, this is envisaged with a heating circulation pump for a heating installation, with which a circulation circuit is a heating circuit for the room heating and the other circulation circuit is a heating circuit for the service water heating. If, as is already counted as belonging to the state of the art with such pumps nowadays, the motor is speed-controlled, then it is advantageous if this control for the detection of the switch-over procedure is part of the control and regulation electronics of the speed controller, and preferably integrated into this with regard to software.

The method according to the invention may then be incorporated into existing circulation pumps by way of a simple software update. Preferably, a frequency converter is applied as a speed controller.

It is particularly with the initially described heating circulation pumps which automatically find their optimized operating point and which typically apart from the regulated operation also provide an unregulated operation, in order to be able to be switched into unregulated operation when problems exceptionally occur in the regulated operation, it is then advantageous to provide such a circulation pump also in unregulated operating conditions with a monitoring of the flow rate course or an electric or hydraulic variable which is dependent thereon, in order to at least be able to determine the switch-over procedure and thus to be able to activate the pump in a suitable manner for operation in the other circulation circuit.

The circulation pump assembly according to the invention advantageously comprises control and regulation electronics which carry out an automatic adaptation of the closed-loop control curve to the installation, as is known for example from DE 195 25 887 C2. A circulation pump assembly designed in such a manner thus not only recognizes the switching procedure within the installation, but automatically adapts to the installation, thus adapts the pump with the driving motor as best as possible to the stationary conditions.

The invention is hereinafter explained in more detail by way of an embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
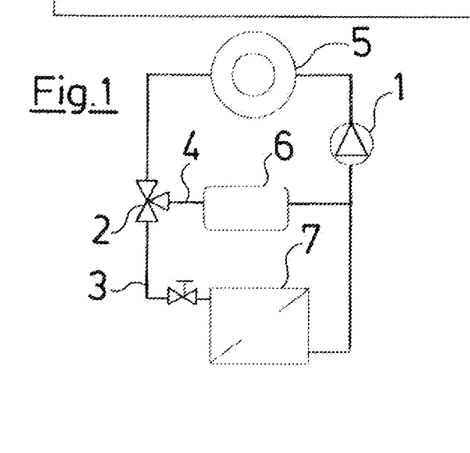
FIG. 1 is a hydraulic circuit diagram of two circulation circuits which by way of a switch-over valve are selectively subjected to a pump.

A typical application of the method according to the invention is represented by way of FIG. 1, with which a heating circulation pump in the form of a centrifugal pump 1 controlled by frequency converter, depending on the switched position of a switch-over valve 2, either feeds into a heating circuit 3 for the room heating or into a heating circuit 4 for service water heating. For this, the heat transfer medium sucked by the pump 1, typically water, is firstly fed to a primary heat exchanger 5, in which it is heated, and from there it gets to the switch-over valve 2 which in its switched position for the room heating leads this water into the heating circuit 3 for the room heating and from there back again to the pump 1, as is usual with heating installations. In order with only one pump and only one primary heat exchanger 5 to not only be able to provide the room heating but also warm water, the second heating circuit 4 having a plate heat exchanger 6 is provided, in which heat exchanger the water coming from the primary heat exchanger 5 releases its heat to the service water. For this, the switch-over valve 2 is then operated in another manner, according to which the heating circuit 3 is shut off and the heating circuit 4 is opened.

With regard to the switch-over valve 2, it is the case of an electromotorically controlled switch valve, as is often applied in gas compact heating installations, for example gas heaters and is described for example in DE 197 51 515 A1 or DE 197 17 799 C5. This switch-over valve 2 has a closure body which either closes the access to the heating circuit 3 or to the heating circuit 4. In order to avoid pressure impacts, the switch-over valve 2 is designed such that it briefly opens the accesses to both heating circuits 3 and 4, during the switching procedure. The switching procedure typically lasts between one and two seconds.

The centrifugal pumps applied in such heating installations are wet-running centrifugal pumps with an asynchronous motor or increasingly also with permanent magnet motors which are activated in a speed-variable manner by a frequency converter arranged in the terminal box of the motor. Thereby, depending on the switched position of the switch-over valve 2, the activation is either effected for the heating circuit 3 for the room heating 7 mostly with a reduced power and only with full power with extreme outer temperatures, whereas the activation of the pump 1 for the heating circuit 4 for service water heating as a rule is such that the pump is operated with a maximal power. With known installations of this type, not only the switch-over valve 2 is activated by the control of the heating installation, but also the circulation pump 1. The latter is no longer necessary by way of the method according to the invention, since the pump 1 automatically detects the switch-over procedure as well as the switched position of the switch-over valve 2. Since the data and operating fields of the pump 1 are known, this may basically be effected by way of detecting the operating point of the pump 1 or of the motor driving this, thus for example by way of the electrical data of the motor or of the differential pressure, which is mustered by the pump, or the flow rate. The physical relations of these variables have been known for some time. Hereinafter, one explains how these conditions are detected or acquired with the help of a flow rate measurement within the pump.

Figure 2A:
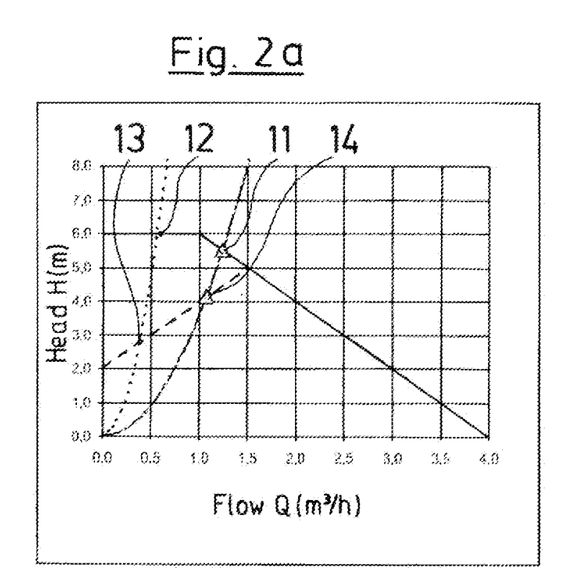
FIG. 2a is a pump curve (HQ diagram)
Figure 2B:
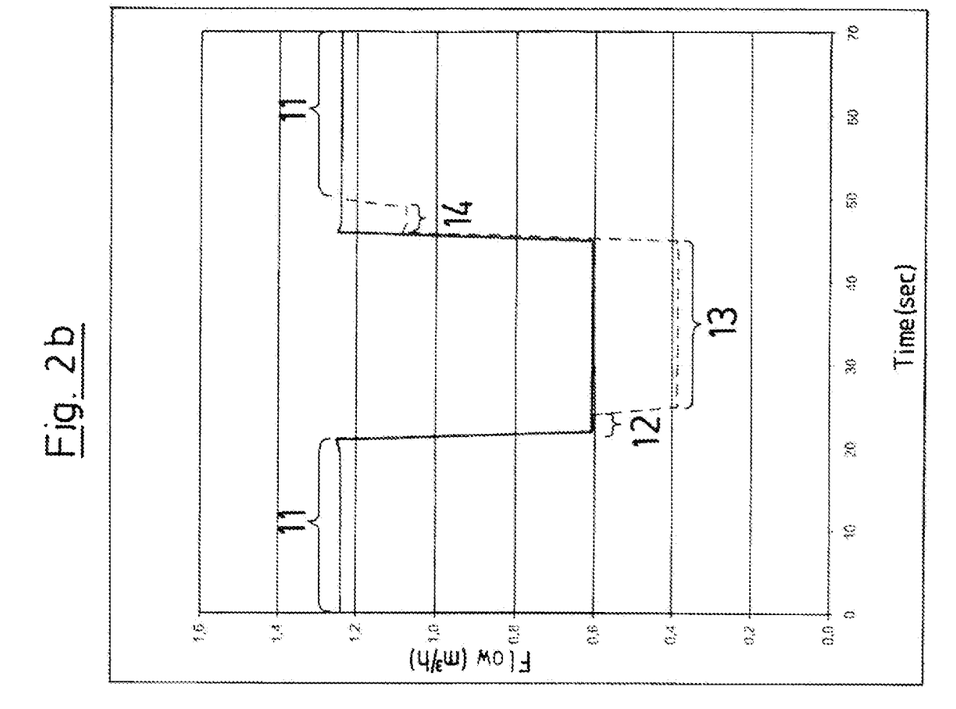
FIG. 2b is a diagram showing the throughput, through the pump, over time.
Figure 3A:
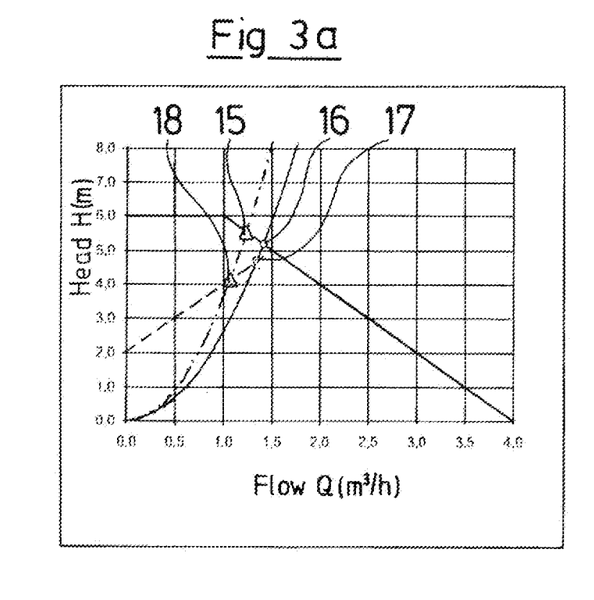
FIG. 3a is a HQ diagram according to FIG. 2a, in different operating points.
Figure 3B:
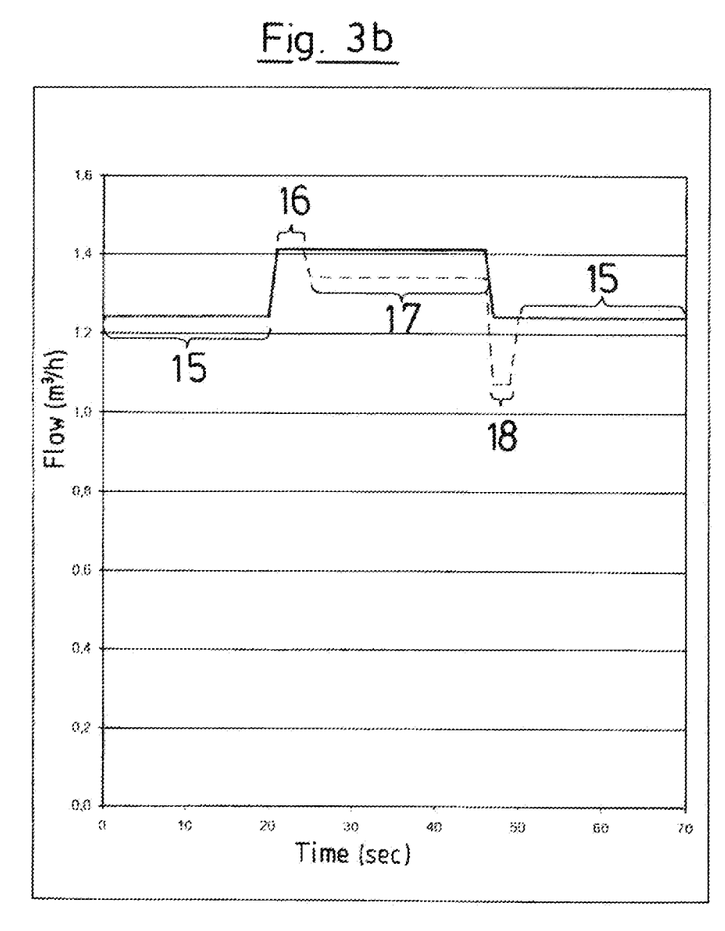
FIG. 3b is a diagram showing the throughput over time in the representation according to FIG. 2b, with different installation characteristics curves.
Figure 4A:
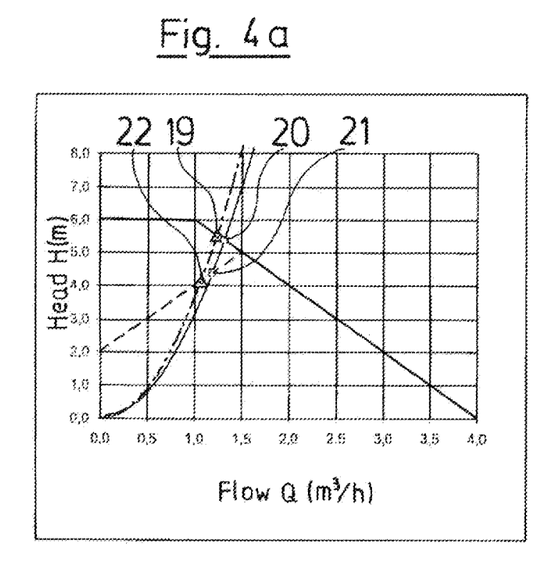
FIG. 4a is a HQ diagram according to FIG. 2a, in other operating points.
Figure 4B:
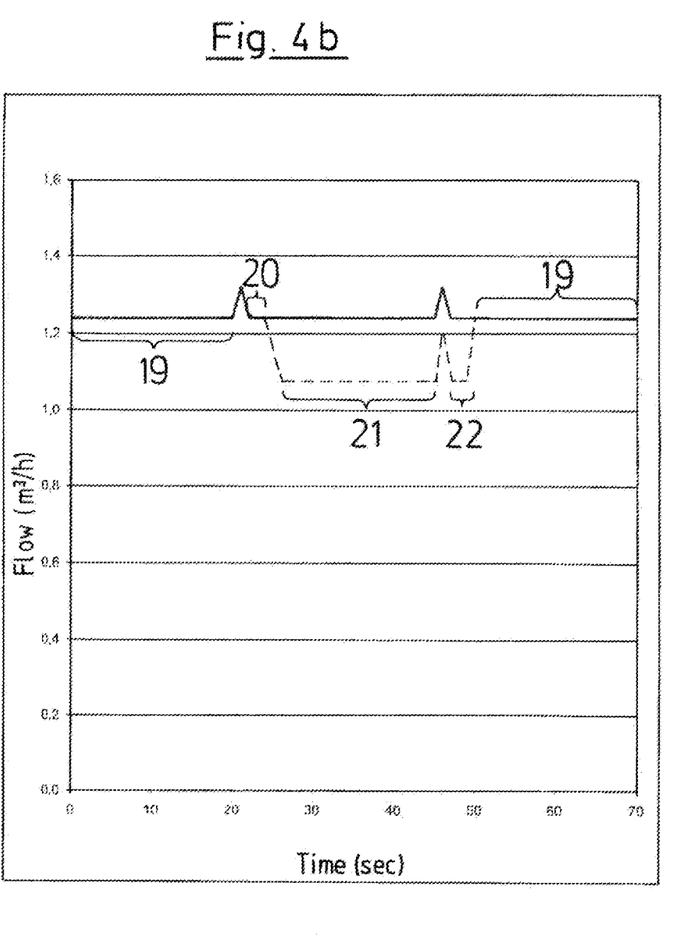
FIG. 4b is a diagram of the throughput over time in the representation according to FIG. 2b, with different installation characteristics curves.

In the FIGS. 2b, 3b and 4b, the throughput of the pump with installations of a different characteristic curve are represented over a time period of seventy seconds, by way of FIGS. 2-4. Whilst the throughput behavior over time is represented in the Figures b, the installation and pump behavior in the Figures a are represented in HQ diagrams. The respective operating points 11-21 in the HQ diagrams 2a-4a are accordingly characterized in the throughput diagrams 2b-4b.

Thereby, firstly in the first twenty seconds, the heating circuit 4 for the service water heating is affected (operating points 11, 15, 19), whereupon a different operation of the switch-over valve 2 is effected, whereupon for about thirty seconds the heating circuit 3 for the room heating is connected to the circulation pump 1 (operating points 13, 17, 21), in order again after operating the switch-over valve 2 in a different manner, to integrate the circulation pump 1 into the heating circuit 4 for service water heating for further twenty seconds (operating points 11, 15, 19). Thereby, it is represented in the Figures b by solid lines in each case, as to how the throughput would behave if the pump were to be activated with maximum power, as would be necessary for the supply of the heating circuit 4 or however by dashed lines with the activation for the supply of the heating circuit 3 with a throttled power.

With the installation represented by way of FIG. 2, the throughput resistance of the heating circuit 4 for the service water heating is significantly lower than that of the heating circuit 3 for the room heating. The curve in the HQ-diagram which is represented in FIG. 2 in a solid line is the maximal curve of the pump, i.e. this curve specifies the delivery rate (flow rate) of the pump in dependence on the delivery head (pressure) at maximal power. The pump runs on this curve if the heating circuit 4 of the service water heating is connected to the pump 1 and the pump is activated with maximum power (operating point 11). Moreover, two installation characteristics curves of the heating circuit for room heating which depart from the origin of the diagram are represented in the HQ diagram, as well as a proportionality curve which intersects these and which represents the regulated operation of the pump, with which the head and flow rate increase proportionally up to the maximal curve.

The curve in FIG. 2b represented with a solid line, with a maximal power of the pump in the present installation begins with a flow rate of 1.25 m3/h (operating point 11), when the switch-over valve 2 integrates the pump 1 into the heating circuit 4 of the warm water heating. At the beginning of the switch-over procedure after about approximately twenty seconds, firstly the flow rate increases slightly, since at the beginning of the switch-over procedure, firstly the conduits to both heating circuits 3 and 4 are opened, whereupon the conduit to the heating circuit 4 is closed and that to the heating circuit 3 is completely opened. Since the heating circuit 3 for the room heating here has a significantly greater conduit resistance than that for the service water heating, the flow rate with a maximal power of the pump drops from 1 to 0.6 m3/h (operating point 12). This steep drop of the flow rate with a constant power of the pump serves as a characteristic criterion for the switch-over procedure. In the present case, this is detected in the pump control, whereupon the pump is activated with a power which is envisaged for operation of the room heating and whose flow rate curve is represented in FIG. 2b in a dashed line (operating point 13). By way of the suitable different operation of the pump, the flow rate is then reduced from 0.6 m3/h in the power stage for the service water heating to 0.4 m3/h in the power stage for the operation of the room heating. A further switch-over procedure follows on the time axis after about 45 seconds. The switch-over valve opens, so that both heating circuits 3, 4 are conductively connected to the pump 1. Due to the throughput resistance which is lower on account of this, the flow rate in the pump increases to 1.1 m3/h (operating point 14). This sudden flow rate increase with a constant power is recognized by the control as a switch-over procedure and switches the pump back to maximal power for the service water heating operation (operating point 11), so that the pump is controlled from the previous flow rates of 1.1 m3/h back to flow rate of 1.2 m3/h which is required for the service water heating. As the present example makes clear, the switch-over procedures are to be identified without further ado by way of the flow rate course of the pump, and the control of the pump is accordingly effected in a different manner or recontrolled accordingly, directly after registering the switch-over procedure in the control by way of the throughput measurement. Here thus the determining of the switch-over procedure is effected by way of the course of the flow rate through the pump directly after the switch-over procedure.

The same switch-over procedures as are represented above by way of FIG. 2, and are of an installation, with which the throughput resistance of the heating circuit 4 for the service water heating is greater than that of the heating circuit 3 for room heating, if specifically the heating circuit 3 operates in bypass operation, are represented by way of FIG. 3. From this, with the throughput course, the opposite is the case, i.e. with the switch-over procedure, after twenty seconds, the flow rate increases from 1.25 m3/h to 1.4 m3/h (operating point 16). The increase in the flow rate which is effected briefly due to the opening of both circuits, here at the bottom goes in the increase after the switch-over procedure which is given in any case. This sudden throughput change is recognized by the system and this directly thereafter controls the pump power from the operation with maximal power (solid line) for the service water circuit 4 to closed-loop power (dashed line) for the heating circuit 3, by which means the delivery rate, i.e. the flow rate through the pump drops (operating point 17). Then, after 45 seconds when the switch-over valve 2 is activated afresh, the flow rate drops steeply to a value of 1.1 m3/h (operating point 18). This drop is registered as a switch-procedure, whereupon the pump is again operated in another manner, into the condition of maximal power (solid line) for affecting the heating circuit 4 (operating point 15). As the example according to FIG. 3 makes clear, this switch-over procedure may also be detected by way of the characteristic steep flow rate change directly after the switching procedure.

If, as is represented by way of FIG. 4, the throughput resistance of both heating circuits 3, 4 is roughly equally large, then the detection is not possible directly before or after the switch-over by way of the flow rate course as with the preceding embodiment examples according to FIG. 2 and FIG. 3, but by way of the flow rate during the switch-over procedure itself. Due to the fact that the switch-over valve during the opening briefly connects both heating circuits 3 and 4 to the pump 1, the hydraulic resistance drops, by which means the delivered quantity briefly increases. This is visible in FIG. 4b by the peak after about twenty seconds as well as subsequently at about 45 seconds. Here, a corresponding switch-over is effected after detecting the switch-over procedure, as is represented by way of the dashed line.

Moreover, the switched condition of the switch-over valve 2 can also be detected by way of the temporal detection of the flow rate within the pump. If the heating circuit 4 for the service water heating is switched on, i.e. the circulation pump 1 exclusively affects this, then seen over time, no changes in the throughput result, disregarding the time period of directly before and after the actual switch-over procedure, since the hydraulic resistance of this heating circuit 4 continues to remain the same. If thus throughput fluctuations within the pump are detected, then one may determine that the switch-over valve 2 is located in the position for affecting the heating circuit 3 for the room heating, since this heating circuit changes its hydraulic resistance on account of the setting valves, in particular thermostat valves which are typically located therein and on account of the regularly changing heat requirement, by which means the flow rate changes. A soon as this is ascertained on the pump side, the converter electronics themselves may activate the pump as is envisaged for affecting the heat circuit 3 for the room heating, should the pump be inadvertently operated in another mode on account of an error. In the reverse case too, an erroneous control may be detected and, as the case may be, be corrected by an operation in another manner, wherein here the time interval, in which the throughput measurement is compared, must be selected in a suitable manner. On the one hand, it must be so long that the changes occur in the heating circuit 3 for room heating and on the other hand so short that the service water heating is not yet completed.

While specific embodiments of the invention have been shown and described in detail to illustrate the application of the principles of the invention, it will be understood that the invention may be embodied otherwise without departing from such principles.

The invention claimed is:

1. A method for controlling a circulation pump in an installation with at least two circulation circuits, with which the circulation pump is integrated by way of a switch-over valve into one or another of the circulation circuits depending on a switched position, the method comprising the steps of:
    operating the pump in a first mode depending on the switched position of the switch-over valve;
    detecting a switch-over procedure of the switch-over valve based on at least one of a pressure course in the pump, a flow rate course in the pump and an electrical variable which is dependent thereon of the motor driving the pump; and
    operating the pump in a second mode upon detecting the switch-over procedure.

2. A method according to claim 1, wherein the switched position of the switch-over valve is detected by way of determining at least one of the pressure course, the flow rate course in the pump and the electrical variable of the motor which is dependent thereon.

3. A method according to claim 2, wherein the circulation pump is arranged in a heating installation with two heating circuits as the circulation circuits, one of the heating circuits being for service water heating and one of the heating circuits being for room heating, in which installation a primary heat exchanger is conductively connected to the one or the other heating circuit by way of a switch-over valve.

4. A method according to claim 1, wherein at least one of the pressure course, the flow rate course in the pump and the electrical variable dependent thereon, of the motor, is continuously detected.

5. A method according to claim 1, wherein the switch-over procedure is determined by way of at least one of the pressure course, the flow rate course and the electrical variable of the motor dependent thereon at least one of during the switch-over procedure, directly before the switch-over procedure and after the switch-over procedure.

6. A method according to claim 1, wherein the switched position is determined by way of at least one of the pressure course, the flow rate course and the electrical variable of the motor dependent thereon between temporally consecutive switch-over procedures.

7. A method according to claim 1, wherein the pressure course or flow rate course is compared with predetermined values for at least one of the switch-over procedure and the switched position, and the at least one of the switch-over procedure and the switched position is determined by way of the comparison.

8. A method according to claim 1, wherein the switched position is monitored by way of the pressure course or of the flow rate course or of an electrical variable of the motor which is dependent thereon, and that a switch-over is carried out automatically in the control given a determining of a switched position which is different from a predetermined switched position in the control.

9. A method according to claim 1, wherein the switched position for service water heating is ascertained given constant values.

10. A method according to claim 1, wherein the switched position for room heating is ascertained given changing values.

11. A circulation pump assembly comprising:
    a speed-controllable electric motor;
    a centrifugal pump driven by the electric motor pump being integrated into an installation with one or another of at least two circulation circuits by way of a switch-over valve depending on a switched position for delivery into one circulation circuit; and
    a controller for the speed control of the motor, wherein the controller comprises control and electronics configured for:
    operating the pump in a first mode depending on the switched position of the switch-over valve;
    detecting a switch-over procedure of the switch-over valve based on at least one of a pressure course, a flow rate course in the pump and an electrical variable which is dependent thereon of the motor driving the pump; and
    operating the pump in a second mode upon detecting the switch-over procedure.

12. A circulation pump assembly according to claim 11, wherein the centrifugal pump is a heating circulation pump and that one circulation circuit is a heating circuit for room heating, and the other circulation circuit is a heating circuit for service water heating.

13. A circulation pump assembly according to claim 11, wherein the controller comprises software.

14. A circulation pump assembly according to claim 11, wherein the controller monitors the flow rate course or electrical or hydraulic variables dependent thereon, in regulated operating conditions as well as in unregulated operating conditions of the pump.

15. A circulation pump assembly comprising:
    a speed-controllable electric motor;
    a centrifugal pump driven by the electric motor being integrated into an installation with one or another of at least two circulation circuits by way of a switch-over valve depending on a switched position for delivery into one circulation circuit; and
    a frequency controller comprising control and regulation electronics configured to:
    operate the pump in a first mode depending on the switched position of the switch-over valve;
    detect a switch-over procedure of the switch-over valve based on at least a flow rate of the pump; and
    operate the pump in a second mode upon detecting the switch-over procedure.

16. A circulation pump according to claim 15, wherein the control and regulation electronics compares a pressure course or a flow rate course with predetermined characteristic values for at least one of the switch-over procedure and the switched position, and the at least one of the switch-over procedure and the switched position is determined by way of the comparison.

17. A circulation pump assembly according to claim 15, wherein the control and regulation electronics monitors the flow rate course or electrical or hydraulic variables dependent thereon, in regulated operating conditions as well as in unregulated operating conditions of the pump.

\* \* \* \* \*